(12) United States Patent
Lin et al.

(10) Patent No.: US 11,375,483 B2
(45) Date of Patent: Jun. 28, 2022

(54) METHOD AND APPARATUS FOR MULTIPLEXING UCI

(71) Applicant: FG Innovation Company Limited, Tuen Mun (HK)

(72) Inventors: Wan-Chen Lin, Hualien (TW); Yu-Hsin Cheng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 84 days.

(21) Appl. No.: 16/818,884

(22) Filed: Mar. 13, 2020

(65) Prior Publication Data

US 2020/0296716 A1    Sep. 17, 2020

Related U.S. Application Data

(60) Provisional application No. 62/819,156, filed on Mar. 15, 2019.

(51) Int. Cl.
*H04W 4/00* (2018.01)
*H04W 72/04* (2009.01)

(52) U.S. Cl.
CPC ..... *H04W 72/0413* (2013.01); *H04W 72/042* (2013.01)

(58) Field of Classification Search
None
See application file for complete search history.

(56) References Cited

U.S. PATENT DOCUMENTS

| 2016/0066282 | A1* | 3/2016 | Ouchi | H04L 5/00 455/522 |
| 2016/0226649 | A1 | 8/2016 | Papasakellariou et al. | |
| 2018/0175993 | A1* | 6/2018 | Onggosanusi | H04B 7/0486 |
| 2018/0227908 | A1* | 8/2018 | Wang | H04L 5/0007 |
| 2019/0037586 | A1* | 1/2019 | Park | H04L 1/0031 |
| 2019/0059013 | A1* | 2/2019 | Rahman | H04B 7/0695 |
| 2019/0199477 | A1* | 6/2019 | Park | H04L 1/0067 |
| 2019/0363843 | A1* | 11/2019 | Gordaychik | H04L 1/1854 |
| 2020/0344752 | A1* | 10/2020 | Li | H04W 72/10 |
| 2020/0351867 | A1* | 11/2020 | Guo | H04L 1/0026 |
| 2020/0374917 | A1* | 11/2020 | Takeda | H04L 5/0044 |
| 2021/0045181 | A1* | 2/2021 | Li | H04L 5/0005 |

(Continued)

FOREIGN PATENT DOCUMENTS

| CN | 108476103 A | 8/2018 |
| WO | 2018111948 A1 | 6/2018 |

OTHER PUBLICATIONS

Qualcomm Incorporated, Multiplexing of PUCCH and PUSCH, 3GPP TSG RAN WG1, Meeting 91, R1-1721387 Dec. 1, 2017(Dec. 1, 2017), sections 1, 5.

(Continued)

*Primary Examiner* — Clemence S Han
(74) *Attorney, Agent, or Firm* — ScienBiziP, P.C.

(57) ABSTRACT

A method for multiplexing UCI performed by a UE is provided. The method includes: receiving, from a BS, an RRC configuration to configure a sequence that is selected from either a first sequence or a second sequence; receiving, from the BS, a DCI message including an indicator; determining a value corresponding to the indicator based on the configured sequence; and multiplexing a UCI message based on the determined value.

16 Claims, 9 Drawing Sheets

(56) References Cited

U.S. PATENT DOCUMENTS

2021/0068100 A1* 3/2021 Takeda .............. H04W 72/0413
2021/0168794 A1* 6/2021 Zhang ............... H04W 72/0413

OTHER PUBLICATIONS

Qualcomm Incorporated, Multiplexing of PUCCH and PUSCH, 3GPP TSG RAN WG1, Meeting 91, R1-1720685 Dec. 1, 2017(Dec. 1, 2017), sections 1, 5.
Ericsson, On UCI Multiplexing on PUSCH, 3GPP TSG-RAN WG1, Meeting #93, Tdoc R1-1807253, May 25, 2018(May 25, 2018), sections 1-4.
3GPP, "Technical Specification, 3GPP; Technical Specification Group Radio Access Network; NR; Physical layer procedures for control (Release 15)", 3GPP TS 38.213 V15.4.0 (Dec. 2018), the whole documents.
Interdigital, Inc., "Potential UCI enhancements for URLLC", 3GPP TSG RAN WG1 Meeting #95, R1-1813163, Nov. 12-16, 2018, sections 2.

* cited by examiner

METHOD AND APPARATUS FOR MULTIPLEXING UCI

CROSS-REFERENCE TO RELATED APPLICATION(S)

The present disclosure claims the benefit of and priority of provisional U.S. Patent Application Ser. No. 62/819,156, filed on Mar. 15, 2019, entitled "Method and apparatus for handling UCI multiplexing on PUSCH" ("the '156 provisional"). The disclosure of the '156 provisional is hereby incorporated fully by reference into the present disclosure.

FIELD

The present disclosure is related to wireless communication, and more particularly, to a method for multiplexing uplink control information (UCI) in cellular wireless communication networks.

BACKGROUND

Various efforts have been made to improve different aspects of wireless communication for cellular wireless communication systems, such as fifth generation (5G) New Radio (NR) by improving data rate, latency, reliability and mobility. If a user equipment (UE) has a physical uplink control channel (PUCCH) transmission overlapping in a slot with a physical uplink shared channel (PUSCH) transmission and the PUCCH transmission and the PUSCH transmission fulfil conditions for reporting multiple UCI types, the UE may multiplex UCI in the PUSCH transmission and drop the PUCCH transmission. The UE may multiplex UCI on the PUSCH transmission by checking whether a first symbol of the earliest PUCCH or PUSCH among a group of overlapping PUCCHs and PUSCHs in a slot satisfies certain timeline conditions and then determine corresponding PUCCHs for transmission in the slot.

There are different service types supported in 5G NR including enhanced Mobile Broadband (eMBB) and Ultra-Reliable Low-Latency Communication (URLLC). Therefore, there is a need for an improved and efficient mechanism for a UE to handle UCI multiplexing for different service types.

SUMMARY

The present disclosure is related to a method performed by a UE in cellular wireless communication network for multiplexing UCIs.

According to an aspect of the present disclosure, a UE is provided that includes one or more non-transitory computer-readable media containing computer-executable instructions embodied therein and at least one processor coupled to the one or more non-transitory computer-readable media. The at least one processor is configured to execute the computer-executable instructions to: receive, from a base station (BS), a Radio Resource Control (RRC) configuration to configure a sequence that is selected from either a first sequence or a second sequence; receive, from the BS, a downlink control information (DCI) message including an indicator; determine a value corresponding to the indicator based on the configured sequence; and multiplex an uplink control information (UCI) message based on the determined value.

According to another aspect of the present disclosure, a method for multiplexing UCI performed by a UE is provided. The method includes: receiving, from a BS, an RRC configuration to configure a sequence that is selected from either a first sequence or a second sequence; receiving, from the BS, a DCI message including an indicator; determining a value corresponding to the indicator based on the configured sequence; and multiplexing a UCI message based on the determined value.

BRIEF DESCRIPTION OF THE DRAWINGS

Aspects of the disclosure are best understood from the following detailed description when read with the accompanying drawings. Various features are not drawn to scale. Dimensions of various features may be arbitrarily increased or reduced for clarity of discussion.

DETAILED DESCRIPTION

Figure 1:
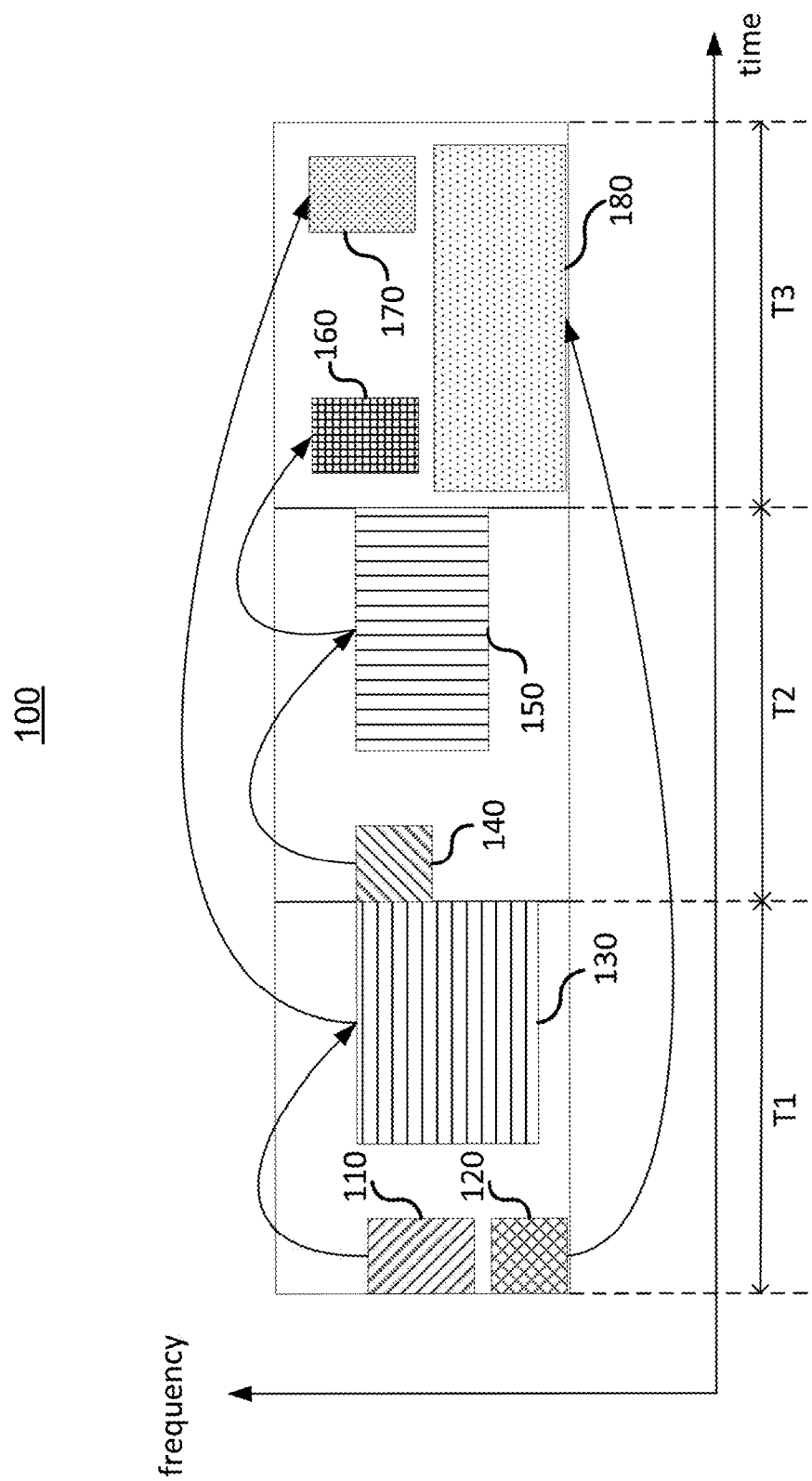
FIG. 1 includes a diagram illustrating a scenario in which a PUCCH transmission overlaps a PUSCH transmission according to an example implementation of the present disclosure.

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the drawings. However, the features in different implementations may be differed in other respects and shall not be narrowly confined to what is shown in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LIE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LIE or LTE-A, a radio network controller (RNC) in UMTS, a BS controller (BSC) in the GSM/GERAN, a ng-eNB in an E-UTRA BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally uplink (UL) resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and an uplink (UL) transmission data should be included in a transmission time interval (TTI) of a single NR frame. The respective portions of the DL transmission data, the guard period, and the UL transmission data should also be configurable based on, for example, the network dynamics of NR. Sidelink resources may also be provided in an NR frame to support ProSe services or V2X services.

A UE may support multiple PUCCHs for Hybrid Automatic Repeat Request Acknowledgement (HARQ-ACK) within a slot for different service types including eMBB and URLLC. PUCCH/PUSCH for the URLLC usually has requirements of low latency and/or high reliability, whereas PUCCH/PUSCH for the eMBB has no such requirement.

Different service types may be indicated by a new DCI format, a new radio network temporary identifier (RNTI), a new search space set, or a new field in an existing DCI format. A new mechanism for multiplexing control information such as UCI with different service types on PUSCH within a time unit may be needed. The granularity of the time unit may be symbol-level transmission, sub-slot level transmission, or slot-level transmission.

FIG. 1 includes a diagram 100 illustrating a scenario in which a PUCCH transmission overlaps with a PUSCH transmission according to an example implementation of the present disclosure. In the first slot T1, the UE receives a physical downlink control channel (PDCCH) 110 for eMBB that schedules physical downlink shared channel (PDSCH) 130 for eMBB. In the first slot T1, the UE also receives an UL grant in PDCCH 120 that schedules PUSCH 180 for eMBB, which is allocated in the third slot T3.

In the second slot T2, the UE receives PDCCH 140 for URLLC that schedules PDSCH 150 for URLLC. In the third slot T3, the UE transmits a HARQ-ACK message in PUCCH 160 in response to data received in PDSCH 150 for URLLC. In the third slot T3, the UE also transmits another HARQ-ACK message in PUCCH 170 in response to data received in PDSCH 130 for eMBB. As illustrated in FIG. 1, PUCCH 160 with HARQ-ACK information for URLLC and PUCCH 170 with HARQ-ACK information for eMBB overlap in the time domain with PUSCH 180 for eMBB.

Figure 2:
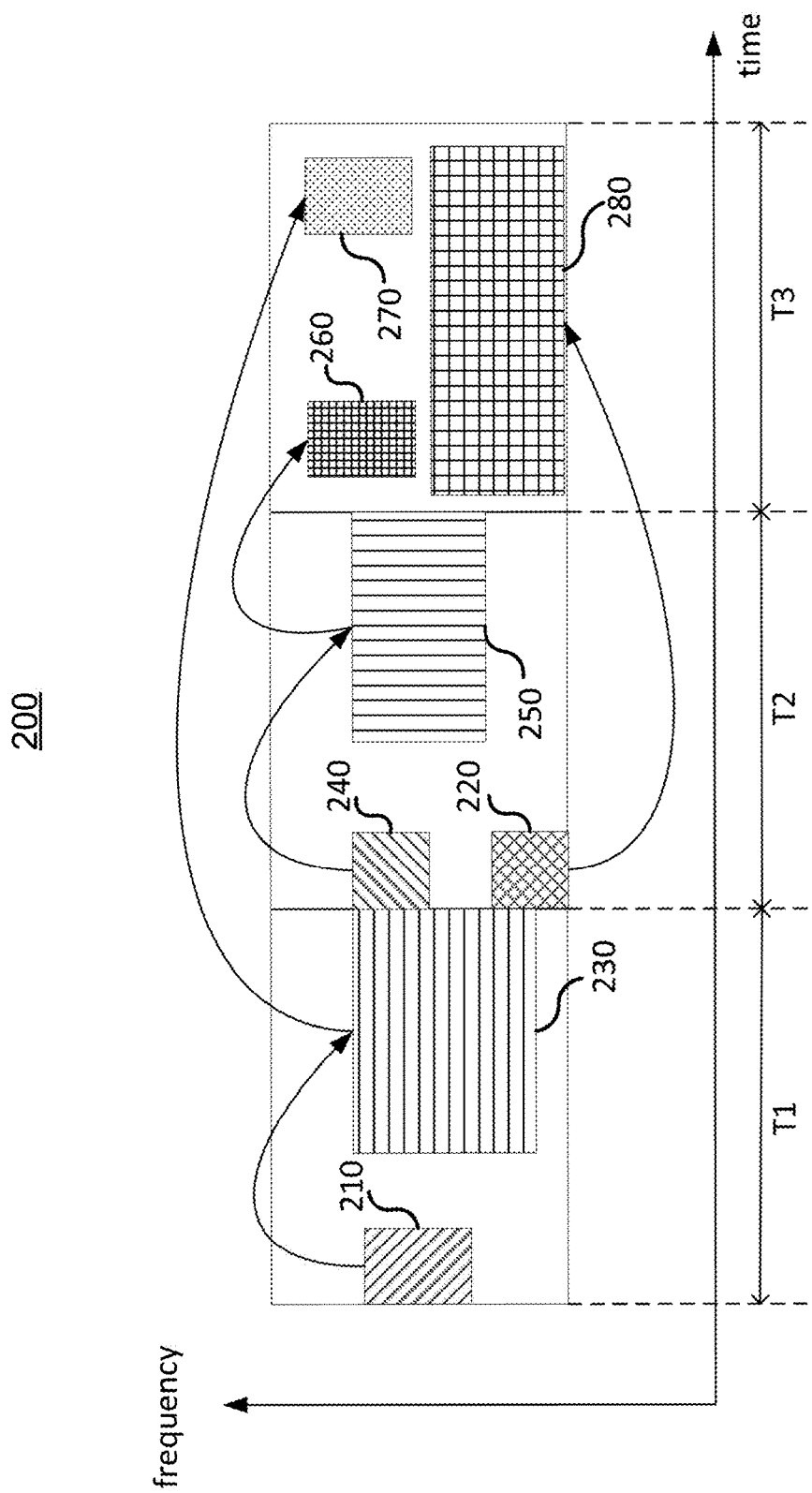
FIG. 2 includes a diagram illustrating another scenario in which a PUCCH transmission overlaps a PUSCH transmission according to an example implementation of the present disclosure.

FIG. 2 includes a diagram 200 illustrating another example scenario in which a PUCCH transmission overlaps with a PUSCH transmission according to an example implementation of the present disclosure. In the first slot T1, the UE receives PDCCH 210 for eMBB that schedules PDSCH 230 for eMBB.

In the second slot T2, the UE receives PDCCH 240 for URLLC that schedules PDSCH 250 for URLLC. In the second slot T2, the UE also receives an UL grant in PDCCH 220 that schedules PUSCH 280 for URLLC that is allocated in the third slot T3.

In the third slot T3, the UE transmits a HARQ-ACK message in PUCCH 260 in response to data received in PDSCH 250 for URLLC. In the third slot T3, the UE also transmits another HARQ-ACK message in PUCCH 270 in response to data received in PDSCH 230 for eMBB. As illustrated in FIG. 2, PUCCH 260 with HARQ-ACK information for URLLC and PUCCH 270 with HARQ-ACK information for eMBB overlap in the time domain with PUSCH 280 for URLLC.

In one implementation, new UE processing capability $N_1'$, $N'$, and $N_2'$ are introduced for URLLC. If a UE would transmit multiple overlapping PUCCHs in a slot or overlapping PUCCH(s) and PUSCH(s) in a slot where at least one of the multiple overlapping PUCCHs or/and PUSCHs includes information for URLLC, the UE is configured to multiplex different UCI types in one PUCCH when at least one of multiple overlapping PUCCHs or PUSCHs is in response to a DCI format detection by the UE.

The UE expects that the first symbol $S_0'$ of the earliest PUCCH or PUSCH for URLLC among a group of overlapping PUCCHs and PUSCHs in the slot satisfies the following timeline conditions:

- $S_0'$ is not before a symbol with cyclic prefix (CP) starting after $T_{proc,1}^{mux}=(N_1'+d_{1,1}+1)\cdot(2048+144)\cdot\kappa\cdot 2^{-\mu}\cdot T_C$ after a last symbol of any corresponding PDSCH.
- $S_0'$ is not before a symbol with CP starting after $T_{proc,release}^{mux}=(N'+d_{1,1}+1)\cdot(2048+144)\cdot\kappa\cdot 2^{-\mu}\cdot T_C$ after a last symbol of any corresponding semi-persistent scheduling (SPS) PDSCH release.
- $S_0'$ is not before a symbol with CP starting after $T_{proc,2}^{mux}=\max((N_2'+d_{2,1}+1)\cdot(2048+144)\cdot\kappa\cdot 2^{-\mu}\cdot T_C, d_{2,2})$ after a last symbol of a PDCCH with the DCI format scheduling the PUSCH and any PDCCH scheduling PDSCH or SPS PDSCH release with corresponding HARQ-ACK information in an overlapping PUCCH in the slot if there is no aperiodic channel state information (CSI) report multiplexed in a PUSCH in the group of overlapping PUCCHs and PUSCHs.

If the conditions are not satisfied, the timeline conditions in Rel-15 Technical Standard (TS) 38.213 may be followed. It should be noted that the definition of the new UE capability ($N_1'$, $N'$, $N_2'$) for URLLC may follow its counterpart ($N_1$, $N$, $N_2$) defined in TS 38.213 and TS 38.214. For example, ($N_1$, $N$, $N_2$) may be selected based on the UE PDSCH processing capability. Values of $d_{1,1}$, $d_{2,1}$, $d_{2,2}$ are specified in TS 38.214. $\kappa$ and $T_C$ are defined in TS 38.211. For example, $T_C$ is the basic time unit for NR, $T_S$ is the basic time unit for LTE, and $\kappa$ is the radio between Ts and Tc. In one implementation, differentiation of HARQ-ACK information for different service types may be provided and the priority of PUCCH resources for different traffic types may be specified.

Figure 3:
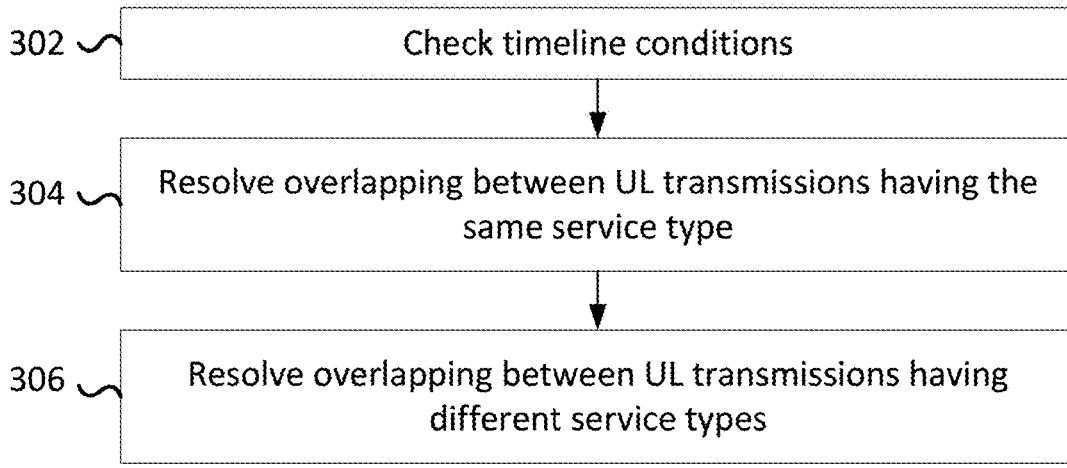
FIG. 3 is a flowchart of a method performed by a UE for handling overlapping between a PUCCH and a PUSCH according to an example implementation of the present disclosure.

FIG. 3 illustrates a flowchart of a method 300 for handling overlapping between a PUCCH and a PUSCH performed by a UE according to an example implementation of the present disclosure. In action 302, the UE may check timeline conditions. In action 302, the UE may also check whether there are enough resources to multiplex the eMBB UCI and/or the URLLC UCI in the PUSCH.

The UE may check whether the starting symbol of a URLLC PUCCH satisfies the above-mentioned timeline conditions if a new UE capability is introduced for URLLC. The UE may also check whether the starting symbol of an eMBB PUCCH satisfies timeline conditions specified in Rel-15 TS 38.213. If no new UE capability is introduced for URLLC, the UE may check whether both the starting symbols of the URLLC PUCCH and the eMBB PUCCH satisfy timeline conditions specified in Rel-15 TS 38.213.

In action 304, the UE may resolve overlapping between UL transmissions having the same service type. Different service types may correspond to different priorities. For example, a URLLC uplink transmission may have a higher priority than an eMBB uplink transmission.

In one implementation, a priority of a PUSCH transmission may be indicated by a field in a DCI format that schedules the PUSCH transmission. In one implementation, a priority of a PUCCH transmission carrying HARQ-ACK in response to a PDSCH transmission may be indicated by a field in a DCI format that schedules the PDSCH transmission. In one implementation, a priority of a PUCCH transmission carrying a scheduling request (SR) may be indicated by an SR configuration transmitted via RRC signaling.

In action 304, the UE may group multiple overlapping PUCCHs together to form a first set. The UE may also group multiple overlapping PUSCHs together to form a second set.

PUCCH 160 illustrated in FIG. 1 may be a set including multiple overlapping PUCCHs having the same priority. When there is a PUCCH overlapping with a PUSCH, the UE may multiplex the PUCCH (e.g., UCI message) in the PUSCH based on a beta offset value. The beta offset value may determine a number of resources used by the UCI message in the PUSCH transmission.

Referring to FIG. 1, the UE may multiplex PUCCH 170 in PUSCH 180 in action 304 because PUCCH 170 for eMBB and PUSCH 180 for eMBB have the same priority. Referring to FIG. 2, the UE may multiplex PUCCH 260 in PUSCH 280 in action 304 because PUCCH 260 for URLLC and PUSCH 280 for URLLC have the same priority.

In action 306, the UE may resolve overlapping between UL transmissions having different service types. In one implementation, the UE may transmit a UL transmission having a higher priority and drop another UL transmission having a lower priority. In one implementation, action 306 may be performed after action 304 in which UL transmissions having the same priority have been grouped together.

Referring to FIG. 1, the UE may transmit PUCCH 160 for URLLC and drop PUSCH 180 in which PUCCH 170 is multiplexed after multiplexing PUCCH 170 in PUSCH 180 because PUCCH 160 has a higher priority than PUSCH 180. Referring FIG. 2, the UE may transmit PUSCH 280 for URLLC and drop PUCCH 270 after multiplexing PUCCH 260 in PUSCH 280 because PUSCH 280 has a higher priority than PUCCH 270.

Figure 4:
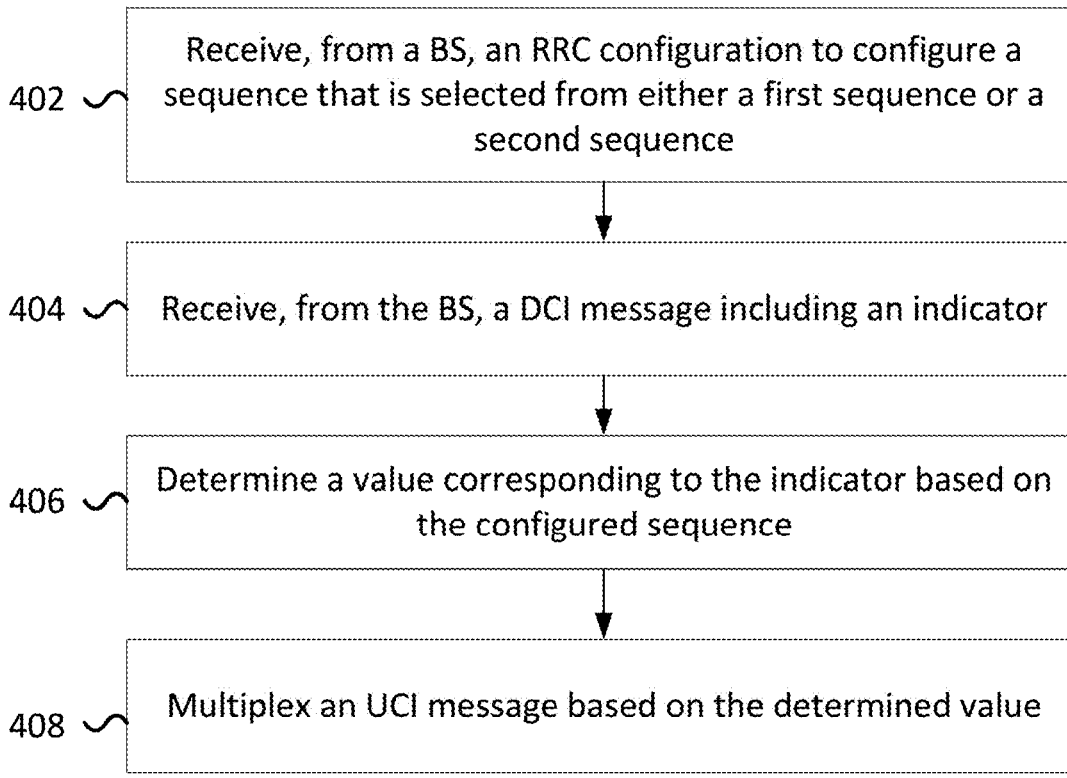
FIG. 4 is a flowchart of a method for multiplexing UCI according to an example implementation of the present disclosure.

FIG. 4 illustrates a flowchart of a method 400 for multiplexing UCI according to an example implementation of the present disclosure. The method 400 may be performed by the UE in action 304 in FIG. 3 for multiplexing the UCI message in a PUSCH transmission.

In action 402, the UE may receive an RRC configuration to configure a sequence from a BS, the sequence selected from either a first sequence or a second sequence. In action 404, the UE may receive a DCI message from the BS, the DCI message including an indicator. In action 406, the UE may determine a value corresponding to the indicator based on the configured sequence. In action 408, the UE may multiplex a UCI message based on the determined value.

In action 402, the UE may be configured with a sequence via RRC signaling. The configured sequence may be selected from either the first sequence or the second sequence. The first sequence and the second sequence may correspond to different service types, such as eMBB and URLLC.

The configured sequence may include multiple beta offset indexes. Beta offset indexes in the first sequence may be different from those in the second sequence such that the first sequence and second sequence may be applicable to different service types.

The RRC configuration received in action 402 may include a first RRC parameter associated with the first sequence and a second RRC parameter associated with the second sequence. The first RRC parameter and the second RRC parameter may correspond to different service types, such as eMBB and URLLC.

In one implementation, the length of the first sequence may be different from the length of the second sequence. The first sequence may include multiple beta offset indexes such as 2, 4, 8, 12 and the second sequence may also include multiple beta offset indexes such as 10, 16. Each beta offset index may correspond to a beta offset value based on a predetermined or preconfigured lookup table.

Table 1 illustrates mapping between beta offset indexes and beta offset values according to the present disclosure. The beta offset value may determine the number of resources for multiplexing the UCI message in the PUSCH transmission.

TABLE 1

| Beta offset index | Beta offset value |
| --- | --- |
| 0 | 1.000 |
| 1 | 2.000 |
| 2 | 2.500 |
| 3 | 3.125 |
| 4 | 4.000 |
| 5 | 5.000 |
| 6 | 6.250 |
| 7 | 8.000 |
| 8 | 10.000 |
| 9 | 12.625 |
| 10 | 15.875 |
| 11 | 20.000 |
| 12 | 31.000 |
| 13 | 50.000 |
| 14 | 80.000 |
| 15 | 126.000 |
| 16 | Reserved |
| 17 | Reserved |
| 18 | Reserved |
| 19 | Reserved |
| 20 | Reserved |
| 21 | Reserved |
| 22 | Reserved |
| 23 | Reserved |

In action 404, the UE receives the DCI message that includes an indicator. The indicator may indicate one of the beta offset indexes in the configured sequence. The configured sequence received in action 402 may include beta offset indexes {2, 4, 8, 12} and the indicator in the DCI message may include values {0, 1, 2, 3} corresponding, respectively, to the first, second, third, and fourth index in the configured sequence. In one implementation, the mapping of indicator values to the beta offset indexes may be configured in a table.

The DCI message may be a first DCI format or a second DCI format. The first DCI format and the second DCI format may correspond to different service types, such as eMBB and URLLC.

The indicator in the first DCI format may correspond to the first sequence and the indicator in the second DCI format may correspond to the second sequence. If the first sequence includes four beta offset indexes, the indicator in the first DCI format may have four different values. If the second sequence includes two beta offset indexes, the indicator in the second DCI format may have two different values.

In one implementation, the indicator in different DCI formats may correspond to different mapping tables. The first DCI format may correspond to eMBB and the second DCI format may correspond to URLLC.

The indicator in the first DCI format may correspond to a first mapping table and the indicator in the second DCI format may correspond to a second mapping table. The second mapping table that maps beta offset indexes to beta offset values may be configured specifically for URLLC by an RRC field for URLLC.

In one implementation, the first DCI format is for scheduling an eMBB transmission and the second DCI format is for scheduling an URLLC transmission. In one implementation, the second DCI format may have fewer bits than the first DCI format.

Such compact DCI format may fulfil the reliability requirement of the URLLC transmission. The indicator in the first DCI format may need two bits to represent four different values, while the indicator in the second DCI format may only need one bit to represent two different values.

In action 406, the UE determines a value corresponding to the indicator based on the configured sequence received in action 402. The received configured sequence may include beta offset indexes {2, 4, 8, 12}, the received indicator in the DCI message may be "00" indicating the first index of the configured sequence in the mapping table, and the UE may determine the value as 2.500 corresponding to index 2 based on Table 1.

In action 408, the UE may multiplex the UCI message based on the determined value 2.500 corresponding to the received indicator. The UE multiplexes the UCI message in a PUSCH transmission scheduled by the received DCI message.

In one implementation, the UCI message may include a HARQ-ACK message in response to a PDSCH transmission. In one implementation, the UCI message may include a CSI report.

Multiple implementations for multiplexing a UCI message in a PUSCH are provided with reference to FIG. 1 and FIG. 2.

Case 1: Multiplex Both eMBB UCI and URLLC UCI in PUSCH

Figure 5:
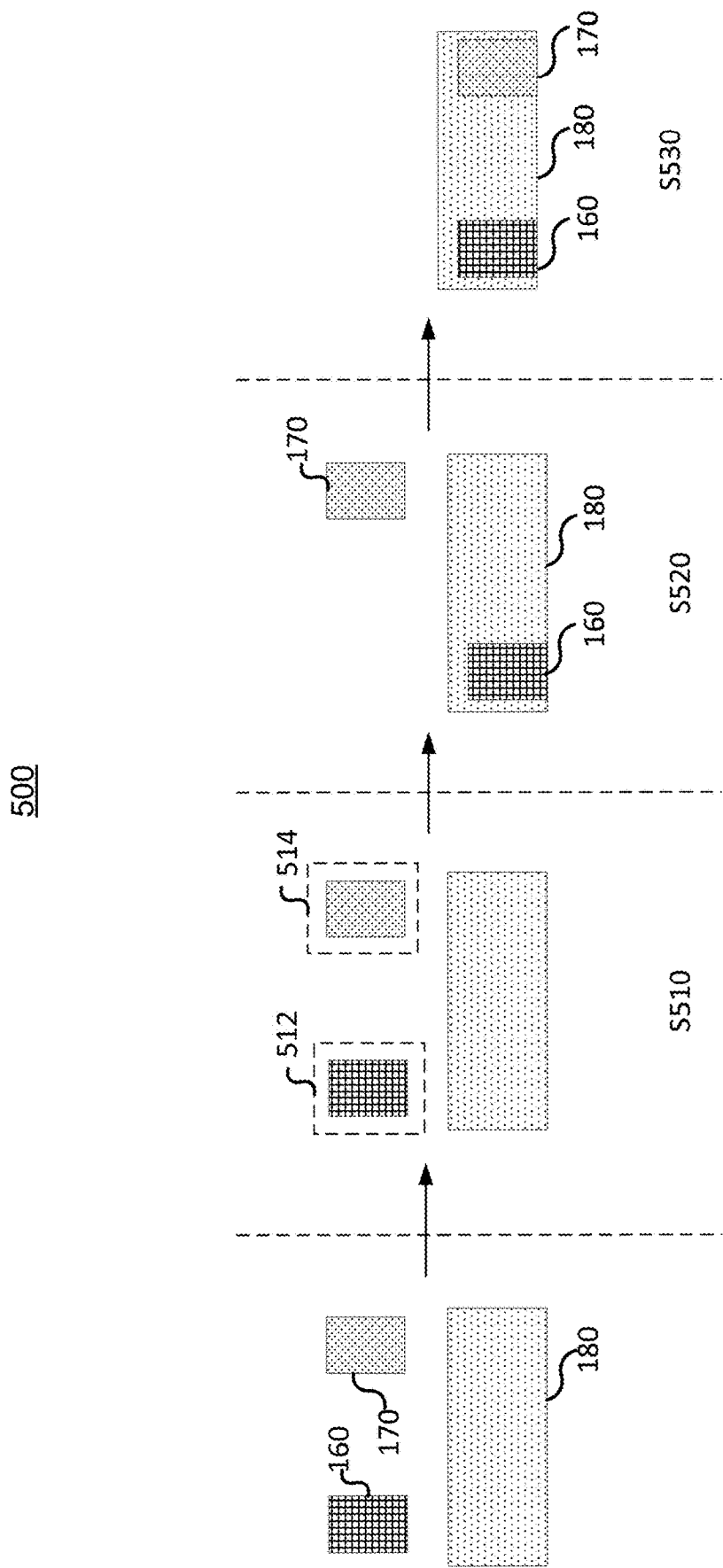
FIG. 5 includes a diagram illustrating a procedure for multiplexing both eMBB UCI and URLLC UCI in a PUSCH according to an example implementation of the present disclosure.

Case 1-1:

The UE may first check timeline conditions in action 302 in FIG. 5 and also check whether there are enough resources to multiplex both the eMBB UCI (e.g., PUCCH 170) and the URLLC UCI (e.g., PUCCH 160) in the PUSCH (e.g., PUSCH 180). The UE may determine that PUCCH resources for different service types are non-overlapped and indicate each PUCCH resource as a different set Q.

Each non-overlapped resource may be indicated by an ascending index of set Q. The UE may indicate the first URLLC PUCCH resource as Q(j), the second URLLC PUCCH resource as Q(j+1), and the first eMBB PUCCH resource as Q(j+2).

In one implementation, the UE may multiplex the URLLC UCI in the eMBB PUSCH by applying a new beta offset (e.g., a beta offset specifically for URLLC UCI).

In one implementation, new beta offsets specifically for URLLC may be configured by RRC when URLLC UCIs are multiplexed on the PUSCH. In one implementation, new alpha scaling values for URLLC (e.g., a parameter scaling_URLLC) configured by RRC may be needed. Two approaches to the new beta offsets are disclosed.

In the first approach, at least one new beta offset value may be obtained from a new URLLC mapping table configured by a new RRC parameter (e.g., betaOffsets_URLLC). In one implementation, the new RRC parameter may also provide a new corresponding beta offset index $I_{offset,URLLC}^{HARQ-ACK}$. The beta offset index $I_{offset,URLLC}^{HARQ-ACK}$ may be indicated in an existing DCI format (e.g., the first DCI format in action 404) or a new DCI format (e.g., the second DCI format in action 404) for scheduling the URLLC transmission.

In the second approach, reserved values in Table 1 for HARQ-ACK information may be replaced with new values configured by a new RRC parameter (e.g., betaOffsets_URLLC). In one implementation, a new beta offset index $I_{offset,URLLC}^{HARQ-ACK}$ may be provided by the new RRC parameter. The new beta offset index $I_{offset,URLLC}^{HARQ-ACK}$ may be indicated in an existing DCI format (e.g., the first DCI format in action 404) or a new DCI format (e.g., the second DCI format in action 404) for scheduling the URLLC transmission.

In one implementation, an RRC information element (IE) UCI-OnPUSCH may include parameters betaOffsets_URLLC and Scaling_URLLC. The parameter betaOffsets_URLLC may configure and indicate a selection between dynamic and semi-static beta offsets.

The "dynamic" field may include a sequence of beta offset indexes. One of the beta offset indexes may be selected by an indicator in the DCI message. The UE may apply the index specified in the "semiStatic" field if the "dynamic" field is absent or not configured.

The beta offset index may be mapped to a beta offset value according to an URLLC beta offset mapping table. The parameter Scaling_URLLC may indicate a scaling factor to limit a number of resource elements assigned to the UCI for URLLC on the PUSCH.

In one implementation, new beta offsets for multiplexing UCI with more than one service type may be configured by RRC when there are multiple service types of UCIs multiplexed on the PUSCH. In one implementation, new alpha scaling values for URLLC (e.g., a parameter scaling_Mux) configured by RRC may also be needed. Two approaches to the new beta offsets are disclosed.

In a first approach, at least one new beta offset value may be obtained from a new multiplexing mapping table configured by a new RRC parameter (e.g., betaOffsets_Mux). In one implementation, the new RRC parameter may also provide a new corresponding beta offset index $I_{offset,URLLC}^{HARQ-ACK}$. The beta offset index $I_{offset,URLLC}^{HARQ-ACK}$ may be indicated by an existing DCI format (e.g., the first DCI format in action 404) or a new DCI format (e.g., the second DCI format in action 404) for scheduling the URLLC transmission.

In a second approach, reserved values in Table 1 for HARQ-ACK information may be replaced with new values configured by a new RRC parameter (e.g., betaOffsets_Mux). In one implementation, a new beta offset index $I_{offset,URLLC}^{HARQ-ACK}$ may be provided by the new RRC parameter. The new beta offset index $I_{offset,URLLC}^{HARQ-ACK}$ may be indicated in an existing DCI format (e.g., the first DCI format in action 404) or a new DCI format (e.g., the second DCI format in action 404) for scheduling the URLLC transmission.

In one implementation, an RRC IE UCI-OnPUSCH may include parameters betaOffsets_Mux and Scaling_Mux. The parameter betaOffsets_Mux may configure and indicate a selection between dynamic and semi-static beta offsets. The "dynamic" field may include a sequence of beta offset indexes. One of the beta offset indexes may be selected by an indicator in a DCI message. The UE may apply the index specified in the "semiStatic" field if the "dynamic" field is absent or not configured.

The beta offset index may be mapped to a beta offset value according to a URLLC beta offset mapping table. The parameter Scaling_Mux may indicate a scaling factor to limit a number of resource elements assigned to the UCI for more than one service type on the PUSCH.

In one implementation, new beta offsets specifically for eMBB may be configured by RRC when UCIs for more than one service type are multiplexed on the PUSCH. In one implementation, new alpha scaling values for multiplexing various service types configured by RRC may also be needed. In one implementation, reserved values in Table 1 for HARQ-ACK information may be replaced with new values for eMBB.

FIG. 5 includes a diagram 500 illustrating a procedure for multiplexing both eMBB UCI and URLLC UCI in the PUSCH according to the present disclosure. Referring to FIG. 1, a PUCCH 160 with UCI for URLLC and PUCCH 170 with UCI for eMBB overlap in the time domain with PUSCH 180 for eMBB.

In action S510, the UE may indicate PUCCH 160 as the first group 512 and indicate PUCCH 170 as the second group 514. In action S520, the UE may multiplex PUCCH 160 carrying URLLC UCI in PUSCH 180 using a first beta offset, which may be configured for URLLC. In action S530, the UE may multiplex PUCCH 170 carrying eMBB UCI in PUSCH 180 using a second beta offset, which may be different from the first beta offset. The method 500 illustrated in FIG. 5 may also be applied to FIG. 2 such that the UE may multiplex both PUCCH 260 and PUCCH 270 in PUSCH 280.

Methods to multiplex encoded UCI resources corresponding to multiple service types within a PUSCH transmission are disclosed.

In a first method, URLLC UCI may be allocated first regardless of a type of UCI. The priority order of UCI messages may be URLLC HARQ-ACK/SR>URLLC CSI>eMBB HARQ-ACK/SR>eMBB CSI. In a second method, URLLC HARQ-ACK/SR may be allocated starting from the first OFDM symbol after the first set of consecutive OFDM symbol(s) carrying demodulation reference signal (DMRS) for better reliability resulting from better channel estimation.

Figure 6:
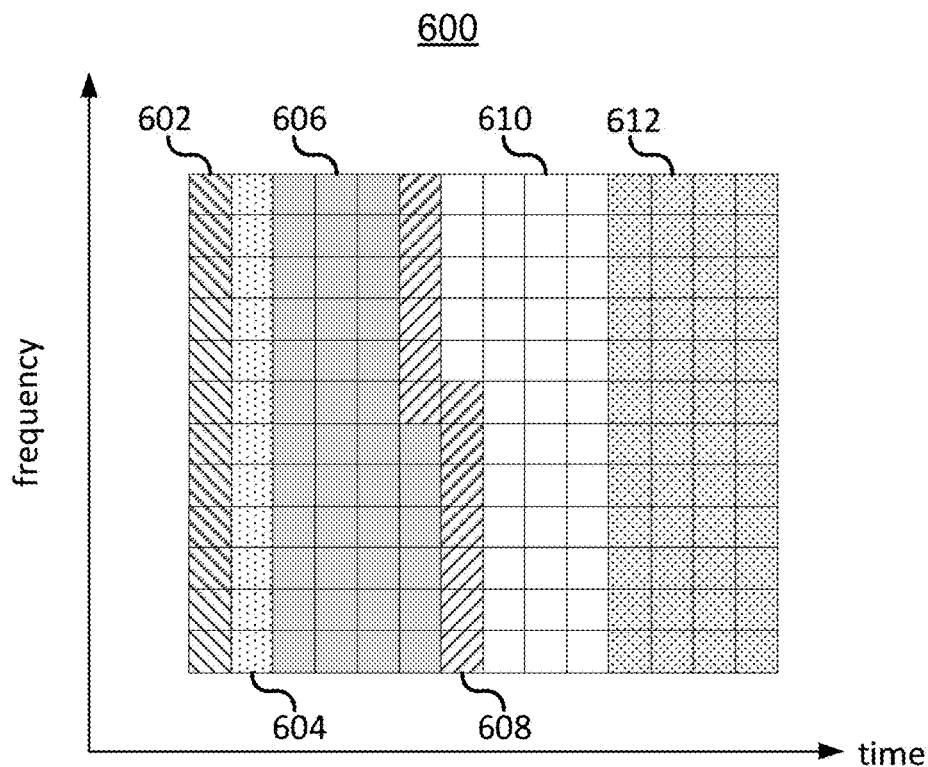
FIG. 6 includes a diagram illustrating resource allocation of UCI messages in a PUSCH resource in which URLLC UCI messages are prioritized according to an example implementation of the present disclosure.

FIG. 6 includes a diagram 600 illustrating a resource allocation of UCI messages in a PUSCH resource in which URLLC UCI messages are prioritized according to an example implementation of the present disclosure. A physical resource block may include 14 OFDM symbols and 12 such that a total of 14×12 resource elements are illustrated in FIG. 6. Resource elements illustrated with same shading correspond to a same type of UL message. As illustrated in FIG. 6, DMRS 602 is allocated first, followed by URLLC HARQ-ACK/SR 604, URLLC CSI 606, eMBB HARQ-ACK/SR 608, eMBB CSI 610, and then data 612.

In one implementation, the order of UCI allocation may depend on a type of UCI. The priority order of UCI messages may be URLLC HARQ-ACK/SR>eMBB HARQ-ACK/SR>URLLC CSI>eMBB CSI. URLLC HARQ-ACK/SR may be allocated starting from the first OFDM symbol after the first set of consecutive OFDM symbol(s) carrying DMRS for better reliability based on better channel estimation.

Figure 7:
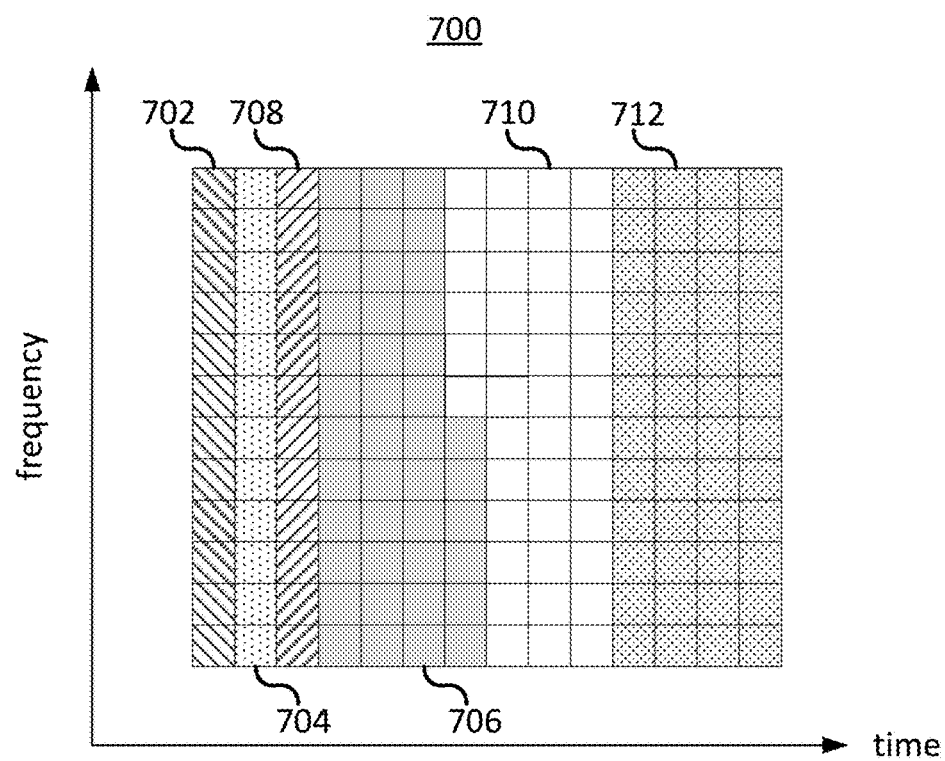
FIG. 7 includes a diagram illustrating resource allocation of UCI messages in a PUSCH resource when UCI types are considered according to an example implementation of the present disclosure.

FIG. 7 includes a diagram 700 illustrating a method for resource allocation of UCI messages in a PUSCH resource when UCI types are considered according to an example implementation of the present disclosure. As illustrated in FIG. 7, DMRS 702 is allocated first, followed by URLLC HARQ-ACK/SR 704, eMBB HARQ-ACK/SR 708, URLLC CSI 706, eMBB CSI 710, and then data 712.

UCIs having a lower priority (e.g., URLLC CSI report or eMBB HARQ-ACK/SR) may be allocated starting from the first OFDM symbol before the first set of consecutive OFDM symbol(s) carrying DMRS.

Figure 8:
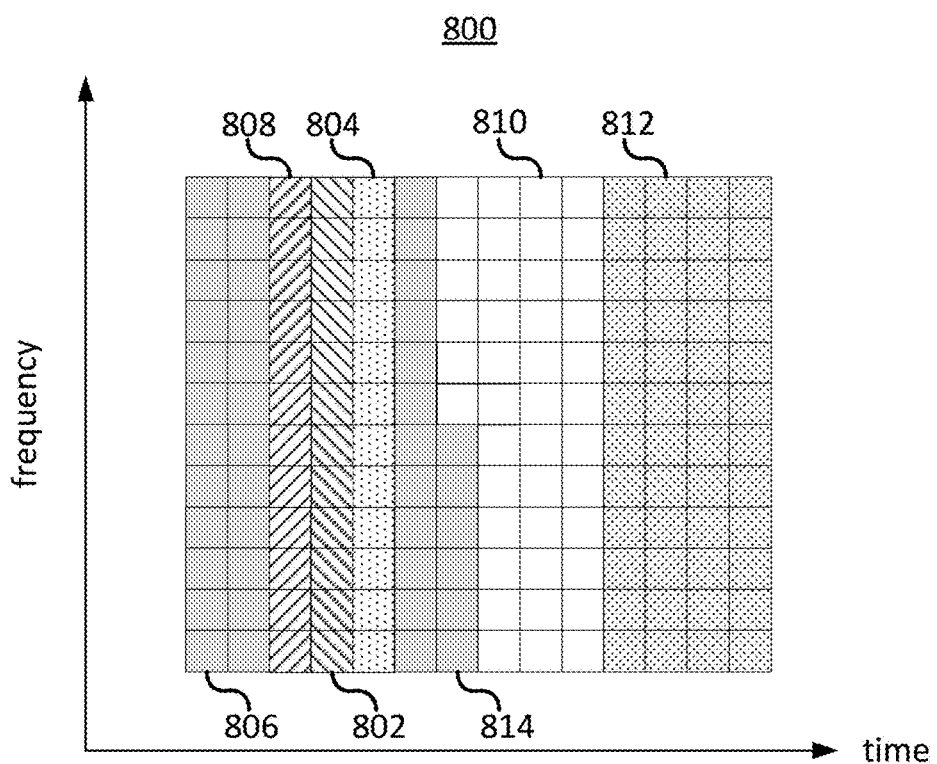
FIG. 8 includes a diagram illustrating resource allocation of UCI messages in a PUSCH resource when UCI messages are allocated before DMRS according to an example implementation of the present disclosure.

FIG. 8 includes a diagram 800 illustrating a method for resource allocation of UCI messages in a PUSCH resource when UCI messages are allocated before DMRS according to an example implementation of the present disclosure. As illustrated in FIG. 8, a first part of URLLC CSI 806 is allocated starting from the first OFDM symbol, followed by eMBB HARQ-ACK/SR 808, DMRS 802, URLLC HARQ-ACK/SR 804, a second part of URLLC CSI 814, eMBB CSI 810, and then data 812.

In one implementation, the order of UCI allocation may be configured by RRC. For example, multiple indexes corresponding to multiple allocation orders may be pre-defined and a BS may transmit an index to a UE via RRC signaling (e.g., IE UCI-onPUSCH). The UE may follow the corresponding allocation order to perform UCI multiplexing when it receives the index.

Case 1-2:

The UE may first check timeline conditions and also check whether there are enough resources to multiplex both the eMBB UCI (e.g., PUCCH 170) and the URLLC UCI (e.g., PUCCH 160) in the PUSCH (e.g., PUSCH 180). The UE may consider PUSCH resources as candidate resources when determining a set Q. The set Q may be a set of resources for transmission of corresponding PUCCH or/and PUSCH in a single slot without repetitions.

Figure 9:
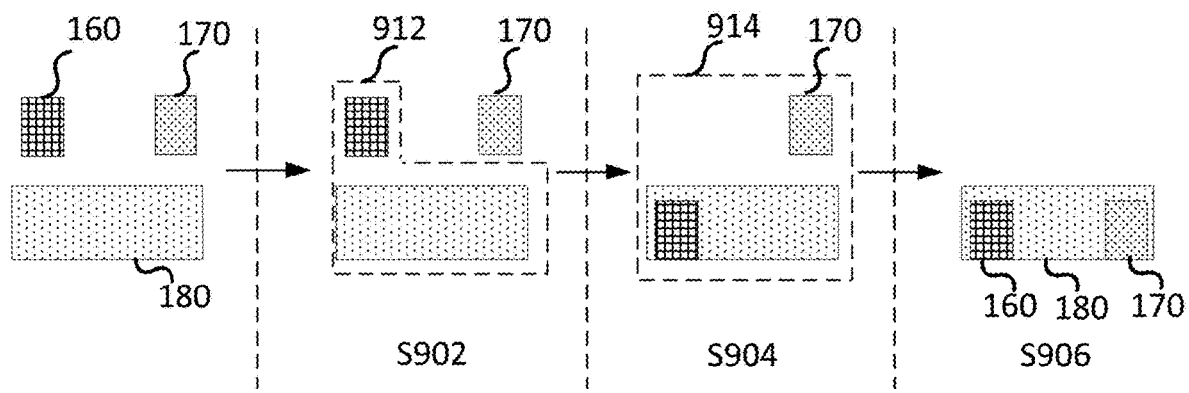
FIG. 9 includes a diagram illustrating a procedure for multiplexing both eMBB UCI and URLLC UCI in the PUSCH according to an example implementation of the present disclosure.

FIG. 9 includes a diagram 900 illustrating a method for multiplexing both eMBB UCI and URLLC UCI in the PUSCH according to an example implementation of the present disclosure. With reference to FIG. 1, PUCCH 160 with UCI for URLLC and PUCCH 170 with UCI for eMBB overlap in the time domain with PUSCH 180 for eMBB.

In action S902, the UE may consider the overlapped PUCCH 160 and PUSCH 180 as a first candidate 912 of the set Q(0). In action S904, the UE may apply a new beta offset to multiplex PUCCH 160 in PUSCH 180 and form set Q(0). The UE may consider the overlapped PUCCH 170 and Q(0) as a second candidate 914 of the set Q(1). In action S906, the UE may multiplex PUCCH 170 in Q(0) and form set Q(1) for transmission. The method 900 illustrated in FIG. 9 may also be applied to FIG. 2 such that the UE may multiplex both PUCCH 260 and PUCCH 270 in PUSCH 280.

In one implementation, in action S904, the new beta offsets specifically for URLLC may be configured by RRC when URLLC UCIs are multiplexed on PUSCH. New alpha scaling values for URLLC (e.g., a parameter scaling_URLLC) configured by RRC may also be needed.

In one implementation, in action S904, the new beta offsets for multiplexing UCI with more than one service types may be configured by RRC when there are multiple service types of UCIs multiplexed on the PUSCH. New alpha scaling values for URLLC (e.g., a parameter scaling_Mux) configured by RRC may also be needed.

Case 2: Multiplex Only URLLC UCI in PUSCH

Case 2-1:

The UE may check timeline conditions and also check whether there are enough resources to multiplex the URLLC UCI (e.g., PUCCH 260) in the PUSCH (e.g., PUSCH 280). In one implementation, the UE may consider that PUCCH resources for different service types are non-overlapped and indicate each PUCCH resource as a different set Q.

Each non-overlapped resource may be indicated by an ascending index of set Q. The UE may indicate the first URLLC PUCCH resource as Q(0), the second URLLC PUCCH resource as Q(1), and the first eMBB PUCCH resource as Q(2).

In one implementation, the UE may compare priority between different sets Q(j) and drop the resource with a lower priority such that the UE may drop the eMBB PUCCH because it has a lower priority than the URLLC PUCCH. Dropping a PUCCH resource with lower priority may be indicated by a field in a subsequent DL assignment. In one implementation, the UE may apply a beta offset value equal to zero to drop a PUCCH resource.

In one implementation, the UE may multiplex the URLLC UCI in the PUSCH by applying a new beta offset. Application of a new beta offset may be performed with reference to Approach A1, A2, B1 and B2 in Case 1-1.

Figure 10:
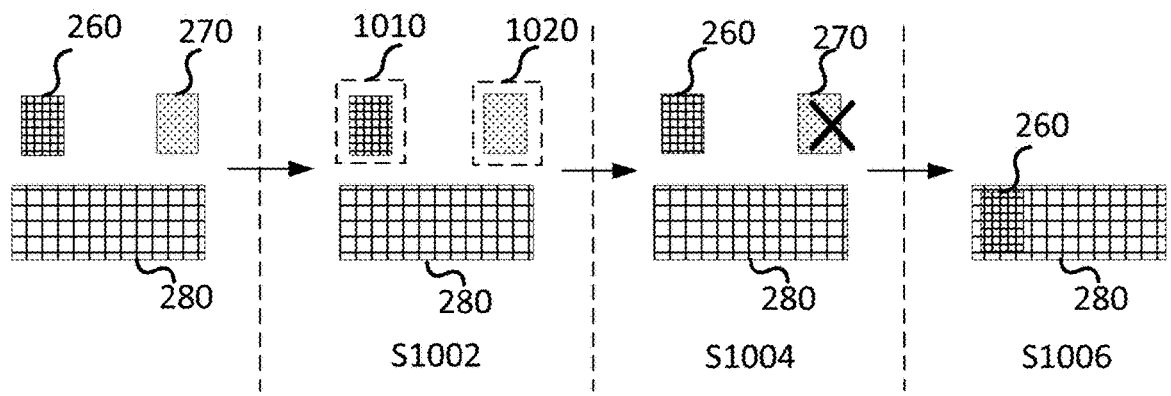
FIG. 10 includes a diagram illustrating a procedure for multiplexing only URLLC UCI in the PUSCH according to an example implementation of the present disclosure.

FIG. 10 includes a diagram 1000 illustrating a method for multiplexing only URLLC UCI in the PUSCH according to an example implementation of the present disclosure. Referring to FIG. 2, PUCCH 260 with UCI for URLLC and PUCCH 270 with UCI for eMBB overlap in the time domain with PUSCH 280 for URLLC.

In action S1002, the UE may indicate PUCCH 260 as a first group 1010 and indicate PUCCH 270 as a second group 1020. In action S1004, the UE may compare priority between different groups. The UE may then decide to drop PUCCH 270 that has a lower priority. In action S1006, the UE may multiplex PUCCH 260 carrying URLLC UCI in PUSCH 280. Step 1006 may be performed before action S1004.

Referring to FIG. 3, the UE may first multiplex PUCCH 260 in PUSCH 280 (action 304) and drop PUCCH 270 that has a lower priority (action 306). The method 1000 illustrated in FIG. 10 may also be applied to FIG. 1 such that the UE may drop PUCCH 170 and multiplex only PUCCH 160 in PUSCH 180.

Case 2-2:

The UE may check timeline conditions and also check whether there are enough resources to multiplex the URLLC UCI (e.g., PUCCH 260) in the PUSCH (e.g., PUSCH 280). In one implementation, the UE may consider a PUSCH resource as one of candidate resources when determining a set Q. The set Q may be a set of resources for transmission of corresponding PUCCH or/and PUSCH in a single slot without repetition.

In one implementation, the UE may first consider resources having a same priority when forming a candidate of set Q. Referring to FIG. 1, the UE may first group PUCCH 170 and PUSCH 180 that have a same priority into a candidate of set Q(0).

Referring to FIG. 2, the UE may first group PUCCH 260 and PUSCH 180 that have the same priority into a candidate of set Q(0). In one implementation, the UE may consider resources in a chronological order when forming a candidate of set Q.

Referring to FIG. 1, the UE may first group PUCCH 160 and PUSCH 180 into a candidate of set Q(0). Referring to FIG. 2, the UE may first group PUCCH 260 and PUSCH 280 into a candidate of set Q(0).

Figure 11:
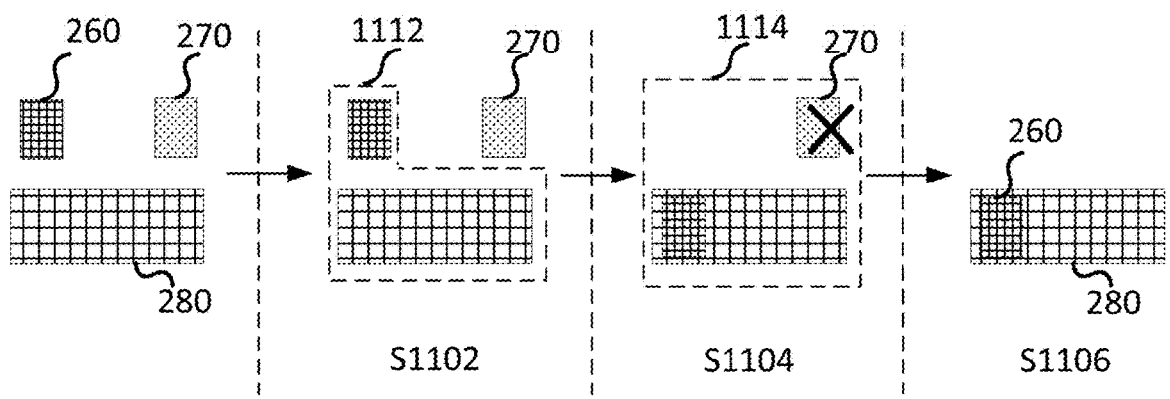
FIG. 11 includes a diagram illustrating another procedure for multiplexing only URLLC UCI in the PUSCH according to an example implementation of the present disclosure.

FIG. 11 includes a diagram 1100 illustrating another method for multiplexing only URLLC UCI in the PUSCH according to an example implementation of the present disclosure. Referring to FIG. 2, PUCCH 260 with UCI for URLLC and PUCCH 270 with UCI for eMBB overlap in the time domain with PUSCH 280 for URLLC. In action S1102, the UE may consider the overlapped PUCCH 260 and PUSCH 280 as a first candidate 1112 of set Q(0). In action S1104, the UE may apply a beta offset from the new mapping table to multiplex PUCCH 260 in PUSCH 280 and form set Q(0).

The UE may consider the overlapped PUCCH 270 and Q(0) as a second candidate 1114 of set Q(1). The UE may check priority between the two resources PUCCH 270 and Q(0). The UE may drop PUCCH 270 having a lower priority. Dropping a PUCCH resource with a lower priority may be indicated by a field in a subsequent DL assignment. The UE may apply a beta offset value equal to zero to drop a PUCCH resource.

In action S1106, the set Q(0) that includes PUCCH 260 and PUSCH 280 is ready for transmission. Implementations of the beta offset in action S1104 may be performed with reference to to Case 1-2.

Referring to FIG. 1, the UE may drop PUCCH 170 and multiplex only PUCCH 160 in PUSCH 180 if the UE considers resources in a chronological order when forming a candidate. Otherwise, the UE may drop the PUSCH 180 in which PUCCH 170 is multiplexed and transmit PUCCH 160 if the UE first considers resources having a same priority when forming a candidate.

Case 3: Only Transmit URLLC PUCCH

Case 3-1:

The UE may first check timeline conditions. The UE may consider PUCCH resources for different service types are non-overlapped and indicate each PUCCH resource as a different set Q.

Each non-overlapped resource may be indicated by an ascending index of set Q. The UE may indicate the first URLLC PUCCH resource as Q(0), the second URLLC PUCCH resource as Q(1), and the first eMBB PUCCH resource as Q(2).

In one implementation, the UE may compare priority between different sets Q(j) and drop the resource with a lower priority. For example, the UE may drop the eMBB PUCCH because it has a lower priority than the URLLC PUCCH.

In one implementation, dropping of a PUCCH resource with a lower priority may be indicated by a field in a subsequent DL assignment. The UE may apply a beta offset value equal to zero to drop a PUCCH resource.

In one implementation, the UE may compare priority between overlapping set Q(j) and PUSCH resource(s) and drop the resource with a lower priority (e.g., an eMBB PUSCH). Dropping a PUSCH resource with a lower priority may be indicated by a field in a DL assignment scheduling URLLC transmission.

Figure 12:
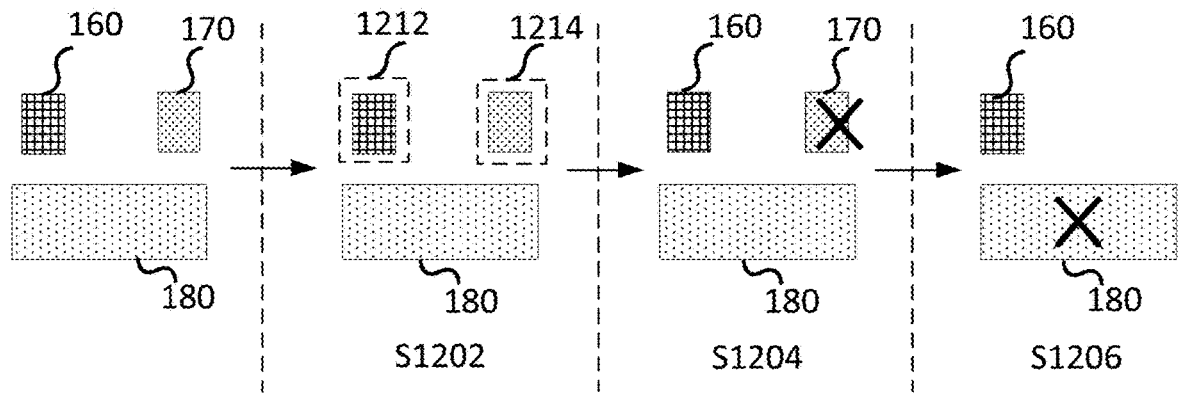
FIG. 12 includes a diagram illustrating a procedure for transmitting only URLLC PUCCH according to an example implementation of the present disclosure.

FIG. 12 includes a diagram 1200 illustrating a method for transmitting only URLLC PUCCH according to an example implementation of the present disclosure. Referring to FIG. 1, PUCCH 160 with UCI for URLLC and PUCCH 170 with UCI for eMBB overlap in the time domain with PUSCH 180 for eMBB.

In action S1202, the UE may indicate PUCCH 160 as the first group 1212 and indicate PUCCH 170 as the second group 1214. In action S1204, the UE may compare priority between different groups. The UE may then decide to drop PUCCH 170 that has a lower priority.

In action S1206, the UE may compare priority between PUCCH 160 and PUSCH 180. The UE may then decide to drop PUSCH 180 that has a lower priority. After dropping PUSCH 180, the UE may transmit only the URLLC PUCCH 160.

Case 3-2:

The UE may first check timeline conditions. The UE may consider PUCCH resources for different service types as non-overlapped and indicate each PUCCH resource as a different set Q. In one implementation, the UE may compare priority between different sets Q(j) and drop the resource with a lower priority.

In one implementation, the UE does not expect to multiplex URLLC UCI on a PUSCH having a different service type (e.g., eMBB). In one implementation, the UE may be instructed by a field in DCI, RRC signaling or UE capability not to multiplex URLLC UCI on a PUSCH. The UE may consider only the URLLC PUCCH(s) as available for transmission when there are multiple overlapping resources in a slot.

Case 4: Only Transmit Non-Overlapping PUCCH Resources

Case 4-1:

The UE may consider PUCCH resources for different service types are non-overlapped and indicate each PUCCH resource as a different set Q. Each non-overlapped resource may be indicated by an ascending index of set Q. The UE may compare priority between overlapping set(s) Q(j) and PUSCH resource(s) before determining whether to multiplex UCIs in each set Q(j) in the PUSCH if the UE is instructed not to multiplex UCI in a PUSCHPUSCH such as by a field in DCI or RRC.

Figure 13:
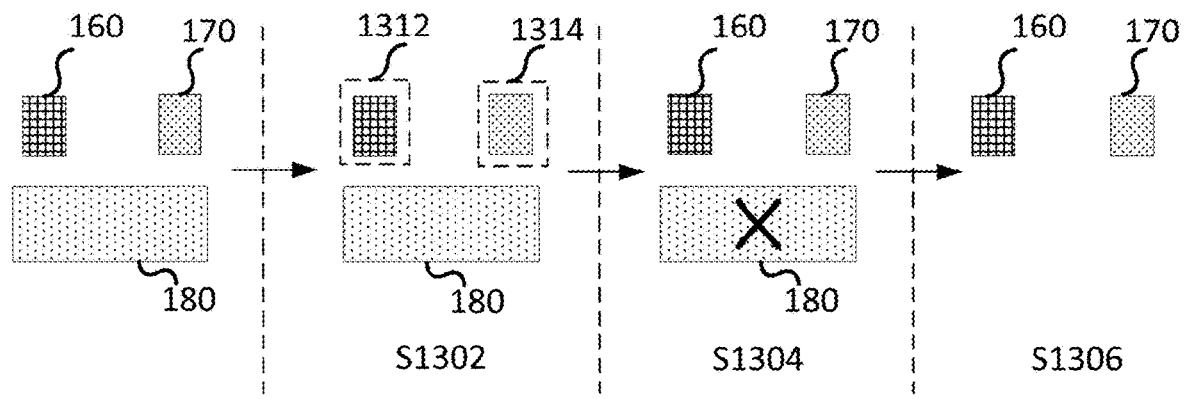
FIG. 13 includes a diagram illustrating a procedure for transmitting only non-overlapping PUCCH resources according to an example implementation of the present disclosure.

FIG. 13 includes a diagram 1300 illustrating a procedure for transmitting only non-overlapping PUCCH resources according to an example implementation of the present disclosure. Referring to FIG. 1, PUCCH 160 with UCI for URLLC and PUCCH 170 with UCI for eMBB overlap in the time domain with PUSCH 180 for eMBB.

In action S1302, the UE may indicate PUCCH 160 as the first group 1312 and indicate PUCCH 170 as the second group 1314. In action S1304, the UE may compare priority between a set Q(0) (which includes PUCCH 160) and PUSCH 180. The UE may drop PUSCH 180 because PUSCH 180 has a lower priority. Dropping the PUSCH 180 may be indicated by a field in a DL assignment scheduling a URLLC transmission. In action S1306, there are no overlapping resources after PUSCH 180 is dropped and the UE may transmit only PUCCH 160 and PUCCH 170.

Case 4-2:

In one implementation, the UE may consider the PUSCH resource as one of the candidate resources when determining a set Q. The set Q may be a set of resources for transmission of corresponding PUCCH or/and PUSCH in a single slot without repetitions. In one implementation, the UE may compare priority between overlapping PUCCH resource(s) and PUSCH resource(s) and drop the resource with a lower priority (e.g., eMBB PUSCH). Dropping a resource with lower priority (e.g., eMBB PUSCH) may be indicated by a field in a DL assignment scheduling a URLLC transmission.

Referring to the example illustrated in FIG. 1, PUCCH 160 is for URLLC and PUSCH 180 is for eMBB. The UE may compare priority between overlapping resources and then drop PUSCH 180 that has a lower priority. After PUSCH 180 is dropped, the UE may indicate PUCCH 160 as Q(0) and PUCCH 170 as Q(1), and the UE may transmit Q(0) and Q(1).

Referring to FIG. 2, PUCCH 260 is for URLLC and PUSCH 280 is also for URLLC. The UE may multiplex PUCCH 260 in PUSCH 280. Multiplexing UCI in this example may be referred to Case 2-1 and Case 2-2.

Case 1-1 through Case 4-2 may all be supported by a UE. ABS may use RRC signaling (e.g., via IE UCI-OnPUSCH) or a field in DCI to indicate to the UE which case to use.

Figure 14:
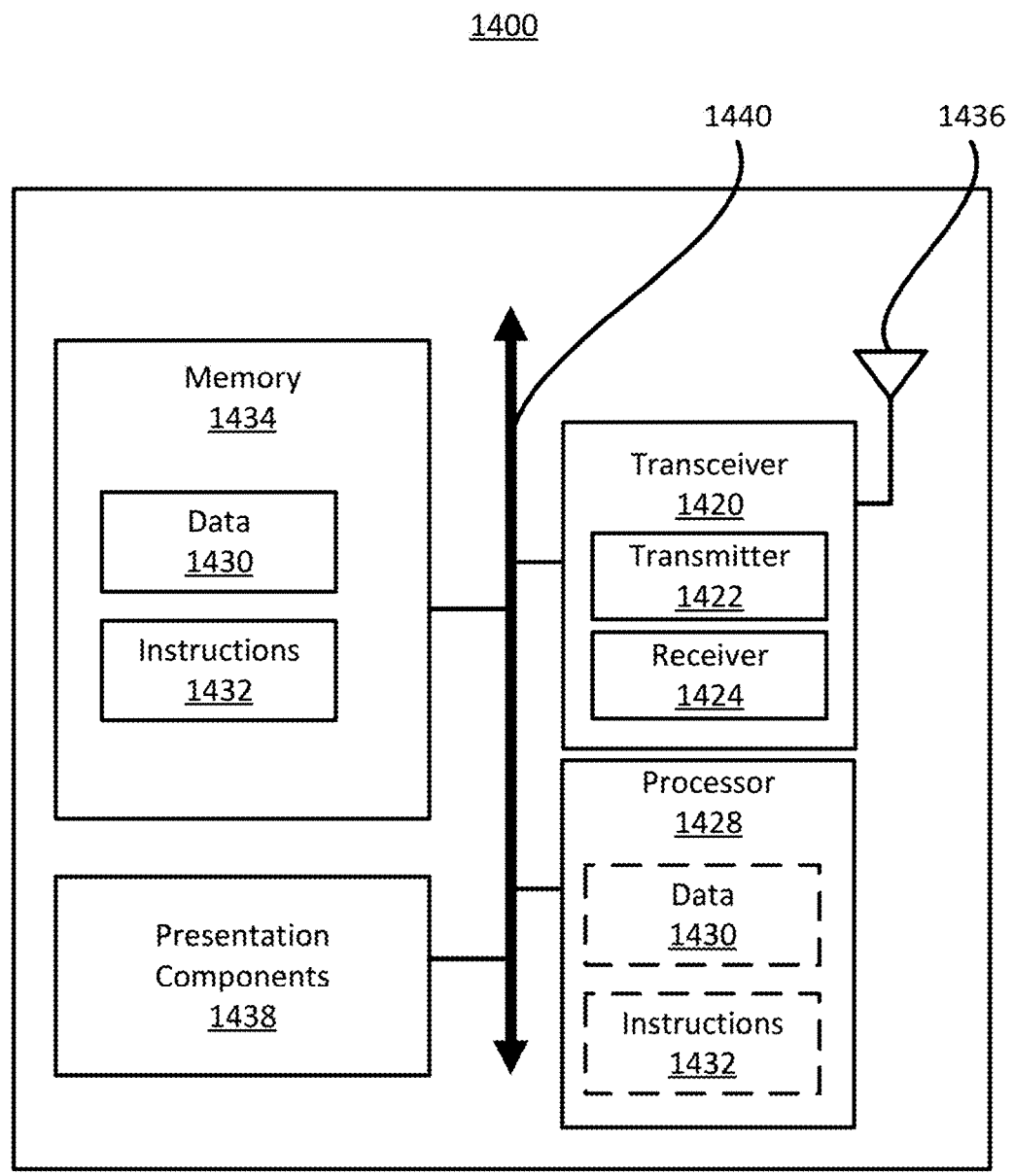
FIG. 14 is a block diagram illustrating a node for wireless communication in accordance with various aspects of the present disclosure.

FIG. 14 is a block diagram illustrating a node for wireless communication according to the present disclosure. As illustrated in FIG. 14, a node 1400 may include a transceiver 1420, a processor 1428, a memory 1434, one or more presentation components 1438, and at least one antenna 1436. The node 1400 may also include an RF spectrum band module, a BS communications module, a network communications module, and a system communications management module, Input/Output (I/O) ports, I/O components, and a power supply (not shown in FIG. 14).

Each of the components may directly or indirectly communicate with each other over one or more buses 1440. The node 1400 may be a UE or a BS that performs various functions disclosed with reference to FIGS. 1 through 13.

The transceiver 1420 has a transmitter 1422 (e.g., transmitting/transmission circuitry) and a receiver 1424 (e.g., receiving/reception circuitry) and may be configured to transmit and/or receive time and/or frequency resource partitioning information. The transceiver 1420 may be configured to transmit in different types of subframes and slots including but not limited to usable, non-usable and flexibly usable subframes and slot formats. The transceiver 1420 may be configured to receive data and control channels.

The node 1400 may include a variety of computer-readable media. Computer-readable media may be any available media that may be accessed by the node 1400 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 1434 may include computer-storage media in the form of volatile and/or non-volatile memory. The memory 1434 may be removable, non-removable, or a combination thereof. Example memory includes solid-state memory, hard drives, optical-disc drives, etc. As illustrated in FIG. 14, the memory 1434 may store computer-readable, computer-executable instructions 1432 (e.g., software codes) that are configured to cause the processor 1428 to perform various functions disclosed herein, for example, with reference to FIGS. 1 through 13. Alternatively, the instructions 1432 may not be directly executable by the processor 1428 but be configured to cause the node 1400 (e.g., when compiled and executed) to perform various functions disclosed herein.

The processor 1428 (e.g., having processing circuitry) may include an intelligent hardware device, e.g., a Central Processing Unit (CPU), a microcontroller, an ASIC, etc. The processor 1428 may include memory. The processor 1428 may process the data 1430 and the instructions 1432 received from the memory 1434, and information transmitted and received via the transceiver 1420, the base band communications module, and/or the network communications module. The processor 1428 may also process information to be sent to the transceiver 1420 for transmission via the antenna 1436 to the network communications module for transmission to a core network.

One or more presentation components 1438 present data indications to a person or another device. Examples of presentation components 1438 include a display device, a speaker, a printing component, and a vibrating component, etc.

In view of the disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) comprising:
   one or more non-transitory computer-readable media containing computer-executable instructions embodied therein; and
   at least one processor coupled to the one or more non-transitory computer-readable media, the at least one processor configured to execute the computer-executable instructions to:
   receive, from a base station (BS), a Radio Resource Control (RRC) configuration to configure a first sequence associated with a first RRC parameter and a second sequence associated with a second RRC parameter;
   receive, from the BS, a first downlink control information (DCI) format including a first indicator and a second DCI format including a second indicator;
   determine a first value corresponding to the first indicator based on the first sequence and a second value corresponding to the second indicator based on the second sequence; and
   multiplex an uplink control information (UCI) message based on one of the first value and the second value.

2. The UE of claim 1, wherein the first sequence includes a first plurality of beta offset indexes and the second sequence includes a second plurality of beta offset indexes.

3. The UE of claim 2, wherein the first indicator indicates one of the first plurality of beta offset indexes and the second indicator indicates one of the second plurality of beta offset indexes.

4. The UE of claim 1, wherein the first DCI format is for scheduling an enhanced mobile broadband (eMBB) transmission corresponding to low priority and the second DCI format is for scheduling an ultra-reliable and low-latency communications (URLLC) transmission corresponding to high priority.

5. The UE of claim 1, wherein the second DCI format has fewer bits than the first DCI format.

6. The UE of claim 1, wherein a length of the first sequence is different from a length of the second sequence.

7. The UE of claim 1, wherein the UCI message is multiplexed in a physical uplink shared channel (PUSCH) transmission scheduled by one of the first DCI format and the second DCI format.

8. The UE of claim 7, wherein the first value corresponding to the first indicator or the second value corresponding to the second indicator determines a number of resources for multiplexing the UCI message in the PUSCH transmission.

9. A method for multiplexing uplink control information (UCI) performed by a user equipment (UE), the method comprising:
   receiving, from a base station (BS), a Radio Resource Control (RRC) configuration to configure a first sequence associated with a first RRC parameter and a second sequence associated with a second RRC parameter;
   receiving, from the BS, a first downlink control information (DCI) format including a first indicator and a second DCI format including a second indicator;
   determining a first value corresponding to the first indicator based on the first sequence and a second value corresponding to the second indicator based on the second sequence; and
   multiplexing an uplink control information (UCI) message based on one of the first value and the second value.

10. The method of claim 9, wherein the first sequence includes a first plurality of beta offset indexes and the second sequence includes a second plurality of beta offset indexes.

11. The method of claim 10, wherein the first indicator indicates one of the first plurality of beta offset indexes and the second indicator indicates one of the second plurality of beta offset indexes.

12. The method of claim 9, wherein the first DCI format is for scheduling an enhanced mobile broadband (eMBB) transmission corresponding to low priority and the second DCI format is for scheduling an ultra-reliable and low-latency communications (URLLC) transmission corresponding to high priority.

13. The method of claim 9, wherein the second DCI format has fewer bits than the first DCI format.

14. The method of claim 9, wherein a length of the first sequence is different from a length of the second sequence.

15. The method of claim 9, wherein the UCI message is multiplexed in a physical uplink shared channel (PUSCH) transmission scheduled by one of the first DCI format and the second DCI format.

16. The method of claim 15, wherein the first value corresponding to the first indicator or the second value corresponding to the second indicator determines a number of resources for multiplexing the UCI message in the PUSCH transmission.

* * * * *